US012573674B2

(12) United States Patent
Kim et al.

(10) Patent No.: US 12,573,674 B2
(45) Date of Patent: Mar. 10, 2026

(54) METHOD OF MANUFACTURING SECONDARY BATTERY

(71) Applicant: LG ENERGY SOLUTION, LTD., Seoul (KR)

(72) Inventors: Young Jae Kim, Daejeon (KR); Jung Woo Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 675 days.

(21) Appl. No.: 17/622,508

(22) PCT Filed: Jul. 16, 2020

(86) PCT No.: PCT/KR2020/009385
§ 371 (c)(1),
(2) Date: Dec. 23, 2021

(87) PCT Pub. No.: WO2021/015488
PCT Pub. Date: Jan. 28, 2021

(65) Prior Publication Data
US 2022/0255150 A1 Aug. 11, 2022

(30) Foreign Application Priority Data
Jul. 22, 2019 (KR) ......................... 10-2019-0088452

(51) Int. Cl.
H01M 10/44 (2006.01)
H01M 4/02 (2006.01)
(Continued)

(52) U.S. Cl.
CPC ....... H01M 10/446 (2013.01); H01M 4/0404 (2013.01); H01M 4/505 (2013.01);
(Continued)

(58) Field of Classification Search
CPC .. H01M 10/446; H01M 4/0404; H01M 4/505; H01M 4/525; H01M 10/0468;
(Continued)

(56) References Cited

U.S. PATENT DOCUMENTS

2005/0106464 A1* 5/2005 Yoshida ................ H01M 4/134
429/231.95
2010/0075217 A1 3/2010 Yamamoto
(Continued)

FOREIGN PATENT DOCUMENTS

CN 1619875 A 5/2005
CN 103782420 5/2014
(Continued)

OTHER PUBLICATIONS

International Search Report (with partial translation) and Written Opinion issued in corresponding International Patent Application No. PCT/KR2020/009385, dated Nov. 4, 2020.
(Continued)

*Primary Examiner* — Nicole M. Buie-Hatcher
*Assistant Examiner* — Taylor Harrison Krone
(74) *Attorney, Agent, or Firm* — Bryan Cave Leighton Paisner LLP

(57) ABSTRACT

The present invention relates to a method of manufacturing a secondary battery comprising the steps of: forming a secondary battery structure comprising an electrode assembly comprising a negative electrode, a positive electrode, and a separator and an electrolyte solution, and activating the secondary battery structure by charging and discharging for at least one cycle while pressing the secondary battery structure at 1.5 MPa to 3.5 MPa, wherein the negative electrode comprises a silicon-based active material.

9 Claims, 1 Drawing Sheet

(51) Int. Cl.

| | |
|---|---|
| *H01M 4/04* | (2006.01) |
| *H01M 4/505* | (2010.01) |
| *H01M 4/525* | (2010.01) |
| *H01M 10/04* | (2006.01) |
| *H01M 10/0525* | (2010.01) |

(52) U.S. Cl.
CPC ....... *H01M 4/525* (2013.01); *H01M 10/0468* (2013.01); *H01M 10/0525* (2013.01); *H01M 2004/021* (2013.01); *H01M 2004/027* (2013.01); *H01M 2004/028* (2013.01)

(58) Field of Classification Search
CPC ....... H01M 10/0525; H01M 2004/021; H01M 2004/022; H01M 2004/027; H01M 2004/028
See application file for complete search history.

(56) References Cited

U.S. PATENT DOCUMENTS

| | | | |
|---|---|---|---|
| 2012/0071040 A1 | 3/2012 | Park et al. | |
| 2013/0288550 A1 | 10/2013 | Park et al. | |
| 2013/0337325 A1 | 12/2013 | Jung et al. | |
| 2014/0030597 A1 | 1/2014 | Jung et al. | |
| 2014/0050985 A1 | 2/2014 | Lee et al. | |
| 2014/0170478 A1 | 6/2014 | Liao et al. | |
| 2015/0372294 A1* | 12/2015 | Minami ................ | H01M 4/366 |
| | | | 429/218.1 |
| 2017/0149089 A1 | 5/2017 | Liao et al. | |
| 2017/0200975 A1 | 7/2017 | Liao et al. | |
| 2018/0108938 A1 | 4/2018 | Iguchi et al. | |
| 2018/0212213 A1 | 7/2018 | Kawai et al. | |
| 2018/0375155 A1 | 12/2018 | Liao et al. | |

| | | | | |
|---|---|---|---|---|
| 2019/0267617 A1* | 8/2019 | Evans | ................... | H01M 4/364 |
| 2019/0372062 A1 | 12/2019 | Kim et al. | | |
| 2019/0379083 A1 | 12/2019 | Jung et al. | | |

FOREIGN PATENT DOCUMENTS

| | | | | | |
|---|---|---|---|---|---|
| CN | 108258347 A | | 7/2018 | | |
| CN | 109671999 A | * | 12/2018 | ........ | H01M 10/0525 |
| CN | 109997261 A | * | 7/2019 | .......... | H01M 50/411 |
| JP | 2003-077527 A | | 3/2003 | | |
| JP | 2003-217671 A | | 7/2003 | | |
| JP | 2004-139961 A | | 5/2004 | | |
| JP | 2005-085627 A | | 3/2005 | | |
| JP | 2009-295289 A | | 12/2009 | | |
| JP | 2010-073571 A | | 4/2010 | | |
| JP | 2016-110777 A | | 6/2016 | | |
| JP | 2017-027727 A | | 2/2017 | | |
| JP | 2018-067444 A | | 4/2018 | | |
| JP | 6407727 B2 | | 10/2018 | | |
| KR | 20120029584 A | * | 9/2010 | ........ | H01M 10/0481 |
| KR | 10-2012-0029584 A | | 3/2012 | | |
| KR | 10-2013-0126365 A | | 11/2013 | | |
| KR | 10-2014-0013469 A | | 2/2014 | | |
| KR | 10-2014-0024587 A | | 3/2014 | | |
| KR | 10-2014-0068551 A | | 6/2014 | | |
| KR | 10-2015-0097605 A | | 8/2015 | | |
| KR | 20160059121 | | 5/2016 | | |
| KR | 10-2017-0074030 A | | 6/2017 | | |
| KR | 10-2019-0031847 A | | 3/2019 | | |
| WO | 2017/057284 A | | 4/2017 | | |
| WO | 2019/054666 A1 | | 3/2019 | | |

OTHER PUBLICATIONS

Extended European Search Report issued in corresponding European Patent Application No. 20844355.6 dated Jul. 4, 2022.

* cited by examiner

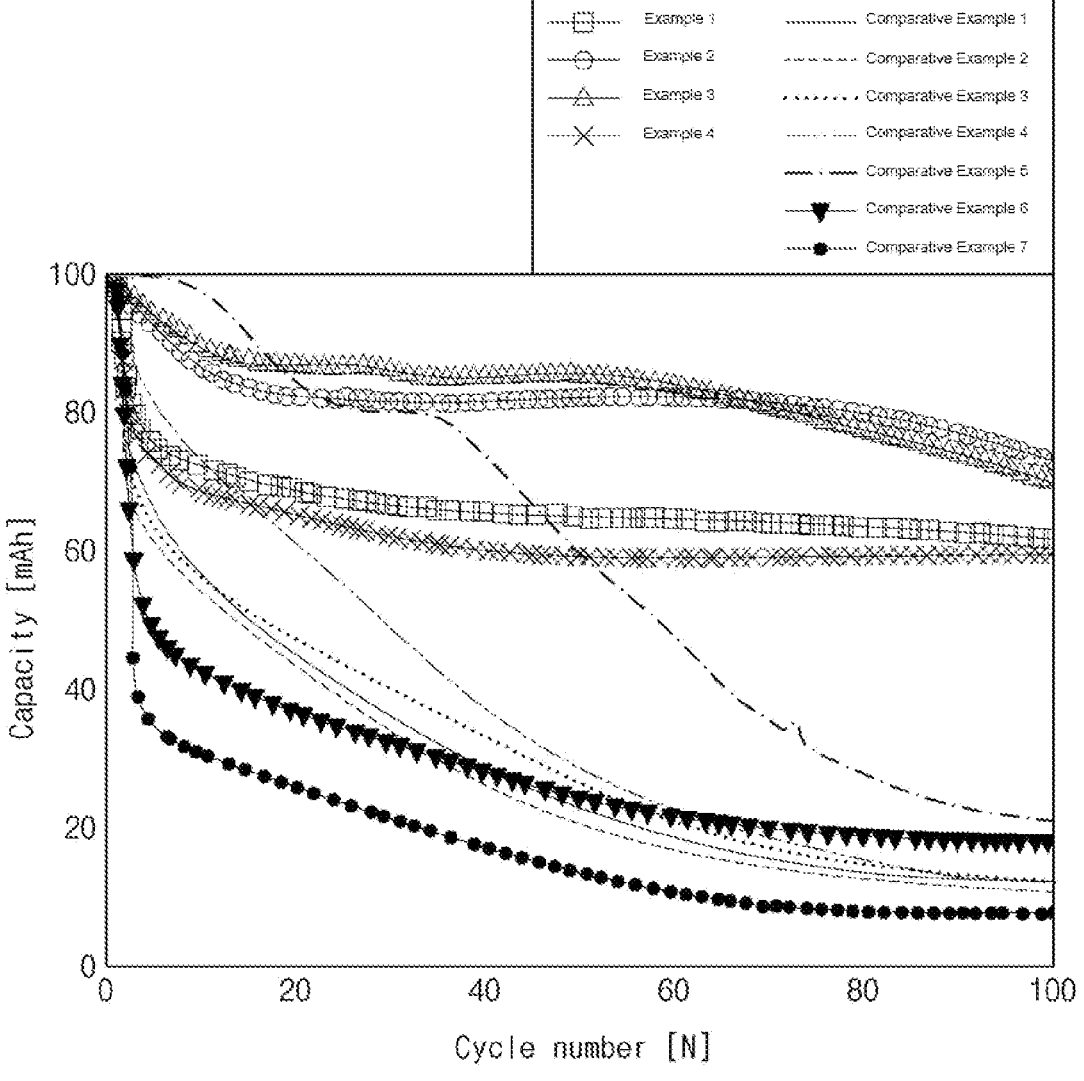

METHOD OF MANUFACTURING SECONDARY BATTERY

CROSS-REFERENCE TO RELATED APPLICATION

This application claims priority to and the benefit of Korean Patent Application No. 10-2019-0088452, filed on Jul. 22, 2019, the disclosure of which is incorporated herein by reference in its entirety.

TECHNICAL FIELD

The present invention relates to a method of manufacturing a secondary battery.

BACKGROUND ART

Recently, with the rapid spread of electronic devices using batteries, such as a mobile phone, a notebook computer, an electric vehicle, and the like, the demand for a secondary battery that is small in size and light in weight but has a relatively high capacity is rapidly increasing. In particular, lithium secondary batteries are light in weight and have a high energy density, and thus are receiving the spotlight as a driving power source for portable devices. Accordingly, efforts on research and development for improving the performance of the lithium secondary battery have been actively made.

The lithium secondary battery generally comprises a positive electrode, a negative electrode, a separator interposed between the positive electrode and the negative electrode, an electrolyte, an organic solvent, and the like. In addition, in the positive electrode and the negative electrode, an active material layer comprising a positive electrode active material or a negative electrode active material may be formed on a current collector. In general, lithium-containing metal oxides such as $LiCoO_2$, $LiMn_2O_4$, and the like are used as positive electrode active materials in the positive electrode, and carbon-based active materials, silicon-based active materials, and the like which do not contain lithium are used as negative electrode active materials in the negative electrode.

In particular, silicon-based active materials have attracted great attention in that the capacity thereof is about 10 times higher than that of carbon-based active materials and have an advantage in which even a thin electrode is capable of realizing high energy density due to their high capacity. However, the silicon-based active materials have not been commonly used due to having a problem in which volume expansion occurs due to charging and discharging, active material particles are cracked/damaged by the volume expansion, and accordingly, lifespan characteristics are deteriorated.

Meanwhile, a secondary battery is manufactured through a process of assembling the secondary battery and a process of activating the secondary battery. Here, the activation process may be performed by injecting an electrolyte solution into the assembled secondary battery to impregnate the secondary battery with the electrolyte solution and charging and discharging the impregnated secondary battery using a charging and discharging device.

Through the activation process, lithium is intercalated into a negative electrode comprised in the secondary battery, and the electrolyte solution reacts with a lithium salt on a surface of the negative electrode to produce compounds such as $Li_2Co_3$, $Li_2O$, LiOH, and the like. These compounds form a kind of passivation layer on the surface of the negative electrode, and the passivation layer is referred to as a solid electrolyte interface layer (hereinafter, referred to as an SEI layer). The formed SEI layer acts as an ion tunnel, allowing lithium ions to pass therethrough. Here, the lithium ions do not undergo side reactions with the negative electrode or other materials again, and the amount of charge consumed in the SEI layer, which is irreversible capacity, does not react reversibly during discharging. Thus, the decomposition of the electrolyte solution does not occur any more due to the formation of the SEI layer, and the amount of lithium ions in the electrolyte solution is reversibly maintained so that stable charging and discharging may be ensured.

In this regard, when the activation process is performed on the negative electrode to which silicon-based active materials are applied, since the degree of volume expansion/contraction in the silicon-based active materials caused by charging and discharging is great as described above, a new surface may be continuously generated at the negative electrode due to a phenomenon in which the active materials are cracked or the contact between the active materials is broken. Accordingly, an SEI layer formation reaction continuously occurs on the new surface of the negative electrode, and the excessive formation of the SEI layer may cause gas produced during the SEI layer formation reaction to increase, and accordingly, local resistance at the negative electrode increases due to the gas production, and the lifespan characteristics of a battery are deteriorated due to lithium precipitation.

Accordingly, there is a need to develop a negative electrode and a secondary battery, to which silicon-based active materials are applied, allowing an SEI layer to be stably formed and improving charge and discharge performance and lifespan characteristics while utilizing the high capacity and energy density of the silicon-based active material.

Korean Unexamined Patent Publication No. 10-2017-0074030 relates to a negative electrode active material for a lithium secondary battery, a method of preparing the same and a lithium secondary battery comprising the same, and discloses a negative electrode active material comprising a porous silicon-carbon composite, but there is a limitation in solving the above-described problems.

PRIOR-ART DOCUMENTS

Patent Documents

Korean Unexamined Patent Publication No. 10-2017-0074030

DISCLOSURE

Technical Problem

The present invention is directed to providing a method of manufacturing a secondary battery allowing an SEI layer to be stably formed during activation and improving lifespan characteristics in a negative electrode and a secondary battery comprising a silicon-based active material.

Technical Solution

One aspect of the present invention provides a method of manufacturing a secondary battery comprising the steps of forming a secondary battery structure comprising an electrode assembly comprising a negative electrode, a positive electrode, and a separator and an electrolyte solution, and activating the secondary battery structure by charging and discharging for at least one cycle while pressing the secondary battery structure at 1.5 MPa to 3.5 MPa, wherein the negative electrode comprises a silicon-based active material.

Advantageous Effects

In a method of manufacturing a secondary battery of the present invention, when a secondary battery comprising a negative electrode comprising a silicon-based active material is manufactured, a pressing process is performed at a specific range of pressure while an activation process is performed. According to the present invention, since the activation process is performed while performing the pressing process within the pressure range, the volume expansion of the silicon-based active material can be suppressed and an SEI layer can be stably formed, and a certain degree of pores can be ensured in a negative electrode, thereby preventing an internal electrolyte solution from being depleted. Accordingly, in the secondary battery manufactured by the above-described method, lifespan characteristics can be significantly improved.

DESCRIPTION OF DRAWINGS

FIG. 1 is a graph illustrating the evaluation of capacity retention rates of secondary batteries of Examples and Comparative Examples.

MODES OF THE INVENTION

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terms used in the present specification are only used to describe specific various embodiments and are not intended to limit the present invention. As used herein, singular forms are intended to include plural forms as well, unless the context clearly indicates otherwise.

It should be understood that the terms "including", "comprising", "containing", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present specification, an average particle diameter ($D_{50}$) may be defined as a particle diameter corresponding to 50% in a cumulative volume-based particle diameter distribution curve. The average particle diameter ($D_{50}$) may be measured using a laser diffraction method. The laser diffraction method may be used to measure a particle diameter in the range from submicrons to several milli meters, and may obtain results with high reproducibility and high resolution.

Hereinafter, the present invention will be described in detail.

<Method of Manufacturing Secondary Battery>

The present invention relates to a method of manufacturing a secondary battery, and particularly, to a method of manufacturing a lithium secondary battery.

Specifically, the method of manufacturing a secondary battery of the present invention comprises the steps of forming a secondary battery structure comprising an electrode assembly comprising a negative electrode, a positive electrode, and a separator and an electrolyte solution, and activating the secondary battery structure by charging and discharging for at least one cycle while pressing the secondary battery structure at 1.5 MPa to 3.5 MPa, wherein the negative electrode comprises a silicon-based active material.

According to the method of manufacturing a secondary battery of the present invention, the secondary battery structure is pressed at a specific range of pressure when the process of activating the secondary battery structure is performed. That is, by pressing the secondary battery structure at a specific range of pressure in the process of charging and discharging the secondary battery structure for the activation, the volume expansion of the silicon-based active material caused by charging and discharging is suppressed. Accordingly, a phenomenon in which active materials are cracked and the active materials in contact with each other are separated due to the volume expansion/contraction of the silicon-based active material may be prevented. In addition, a phenomenon may be prevented in which an SEI layer formation reaction continuously occurs, gas is excessively produced due to the reaction, local resistance of the negative electrode is increased due to the gas production, lithium is precipitated, and accordingly, lifespan characteristics are deteriorated. In addition, when the process of activating the secondary battery structure is performed while pressing the secondary battery structure at the specific range of pressure, it is preferable in view of improving lifespan characteristics because the volume expansion of the silicon-based active material caused by charging and discharging may be prevented, and also, an appropriate level of pores may be secured in a negative electrode and accordingly an electrolyte solution may be prevented from being depleted due to a decrease in porosity.

<Formation of Secondary Battery Structure>

The method of manufacturing a secondary battery of the present invention comprises a step of forming a secondary battery structure comprising an electrode assembly comprising a negative electrode, a positive electrode, and a separator, and an electrolyte solution.

The electrode assembly comprises a negative electrode, a positive electrode, and a separator. Specifically, the electrode assembly may comprises the negative electrode, the positive electrode facing the negative electrode, and the separator interposed between the negative electrode and the positive electrode.

The negative electrode comprises a silicon-based active material.

The silicon-based active material may comprise a compound represented by Formula 1 below, $$SiO_x (0<x<2) \qquad \text{[Formula 1]}$$

In Formula 1, Sift may not react with lithium ions and thus not store lithium. Thus, it is preferable that x is within the above-described range.

Specifically, the silicon-based active material may comprise Si. Conventionally, Si is advantageous in that the capacity thereof is about 2.5 to 3 times higher than that of silicon oxide (e.g., SiOx ($0<x<2$)), but has a problem in that the commercialization thereof is not easy due to the very high degree of volume expansion/contraction of Si caused by charging and discharging compared to that of silicon oxide. However, in the present invention, as will be described below, since an activation process is performed while pressing the secondary battery structure at a specific range of pressure, the volume expansion of Si may be suppressed, and the contact between the active materials may be maintained, thereby preferably realizing advantages of high capacity and high energy density of Si.

The silicon-based active material may have an average particle diameter ($D_{50}$) of 1 µm to 10 µm, and preferably, 2 µm to 6 µm in view of ensuring the structural stability of the active material during charging and discharging, reducing side reactions by reducing a reaction area with an electrolyte solution, and stable dispersion of the silicon-based active material in a negative electrode active material layer.

The negative electrode may comprise a negative electrode current collector and a negative electrode active material layer formed on the negative electrode current collector. In this case, the silicon-based active material may be comprised in the negative electrode active material layer.

The negative electrode current collector is not particularly limited as long as it has high conductivity without causing chemical changes in the battery. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may generally have a thickness of 3 to 100 µm, and preferably, 4 µm to 40 µm, to realize a negative electrode with low thickness.

The negative electrode current collector may have fine irregularities formed on a surface thereof to increase the binding force of a negative electrode active material. For example, the negative electrode current collector may be used in various forms such as a film, a sheet, a foil, a net, a porous body, a foamed body, a non-woven fabric, and the like.

The negative electrode active material layer is formed on the negative electrode current collector.

The silicon-based active material may be comprised in an amount of 50 wt % to 90 wt %, and preferably, 60 wt % to 80 wt % in the negative electrode active material layer in view of easily realizing high capacity of a silicon-based negative electrode active material.

The negative electrode active material layer may further comprise a binder and/or a conductive material in addition to the above-described silicon-based active material. Preferably, the negative electrode active material layer may further comprise a binder and a conductive material.

The binder may comprise at least one selected from the group consisting of styrene butadiene rubber (SBR), acrylonitrile butadiene rubber, acrylic rubber, butyl rubber, fluoro rubber, polyvinyl alcohol, carboxymethylcellulose (CMC), starch, hydroxypropylcellulose, regenerated cellulose, polyvinyl alcohol (PVA), polyacrylic acid (PAA), polyethylene glycol (PEG), polyacrylonitrile (PAN), and polyacryl amide (PAM) in view of improving electrode adhesion and imparting sufficient resistance to the volume expansion/contraction of the silicon-based negative electrode active material. The negative electrode binder may be a copolymer of two or more components selected from the components described above.

The binder may comprise an aqueous binder in which hydrogen is substituted with Li, Na, or Ca in view of allowing the binder to be more easily dispersed in an aqueous solvent such as water when preparing a slurry for forming a negative electrode active material layer, and coating an active material more easily to improve a bonding force.

Preferably, the binder may comprise at least one selected from the group consisting of polyvinyl alcohol, polyacrylic acid, polyacrylonitrile, and polyacryl amide and preferably comprises polyvinyl alcohol and polyacrylic acid in view of having high strength, excellent resistance to the volume expansion/contraction of the silicon-based active material, and imparting excellent flexibility to the negative electrode binder so as to prevent an electrode from being warped, bent, and the like. When the negative electrode binder comprises polyvinyl alcohol and polyacrylic acid, the polyvinyl alcohol and polyacrylic acid may be comprised in a weight ratio of 50:50 to 90:10, and preferably, 55:45 to 80:20 in the negative electrode binder in view of further enhancing the above-described effects.

The binder may be comprised in an amount of 5 wt % to 30 wt %, and preferably, 10 wt % to 20 wt % in the negative electrode active material layer, and an amount of binder in this range is preferable in view of improving the binding force of the binder to effectively control the volume expansion of the active material, and improving the coating property and phase stability of a negative electrode slurry when the negative electrode is manufactured.

The conductive material may be used to improve the conductivity of the negative electrode, and any conductive material that does not cause a chemical change and has conductivity is preferably used. Specifically, the conductive material may comprise at least one selected from the group consisting of natural graphite, artificial graphite, carbon black, acetylene black, Ketjen black, channel black, furnace black, lamp black, thermal black, a conductive fiber, fluorocarbon, aluminum powder, nickel powder, zinc oxide, potassium titanate, titanium oxide, a carbon nanotube, a carbon nanofiber, and a polyphenylene derivative and preferably comprises carbon black in view of realizing high conductivity and excellent dispersibility.

The conductive material may be comprised in an amount of 2 wt % to 20 wt %, and preferably, 5 wt % to 15 wt % in the negative electrode active material layer, and an amount of conductive material in this range is preferable in view of exhibiting excellent conductivity.

A thickness of the negative electrode active material layer may be in a range of 20 µm to 120 µm, preferably 30 µm to 90 µm, and more preferably 35 µm to 60 µm in view of increasing the energy density of a cell and allowing the electrolyte solution to smoothly enter and exit.

A porosity of the negative electrode may be in a range of 37% to 45%, and preferably, 38% to 41% in view of properly accommodating the volume expansion/contraction of the silicon-based active material, and maintaining the degree of contact between the active materials at an appropriate level.

The porosity of the negative electrode may be defined as a value calculated by Equation 2 below, porosity of negative electrode (%)={1−electrode density of negative electrode active material layer/true density of negative electrode active material layer}×100   [Equation 2]

In Equation 2, the electrode density of the negative electrode active material layer is the density of the negative electrode active material layer measured using the above-described negative electrode, and the true density of the negative electrode active material layer is the density of the negative electrode active material layer measured when a negative electrode is pressed using pressing equipment until the thickness of the negative electrode is not changed.

The porosity of the negative electrode may be defined as the porosity of the negative electrode before activation in view of distinguishing it from a porosity of the negative electrode after activation, which will be described below.

The negative electrode may be manufactured by applying a negative electrode slurry comprising a negative electrode active material, and optionally, a binder, a conductive material, and/or a solvent for forming a negative electrode slurry onto the negative electrode current collector, and then performing drying and rolling.

For example, the solvent for forming a negative electrode slurry may comprise at least one selected from the group consisting of distilled water, ethanol, methanol, and isopropyl alcohol and preferably comprises distilled water in view of facilitating the dispersion of the negative electrode active material, the binder, and/or the conductive material.

The solvent for forming a negative electrode slurry may be comprised in the negative electrode slurry such that the concentration of the solid content comprising the negative electrode active material, the binder, and selectively, the conductive material is in a range of 15 wt % to 45 wt %, preferably, 20 wt % to 30 wt %, and more preferably, 24 wt % to 27 wt % in consideration of a viscosity, coating properties, dispersibility, and the like of the negative electrode slurry.

The positive electrode may be disposed to face the negative electrode.

The positive electrode may comprise a positive electrode current collector and a positive electrode active material layer formed on the positive electrode current collector.

The positive electrode current collector is not particularly limited as long as it has high conductivity without causing chemical changes in the battery. Specifically, as the positive electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The positive electrode current collector may generally have a thickness of 3 to 500 μm.

The positive electrode current collector may have fine irregularities formed on a surface thereof to increase the binding force of a positive electrode active material. For example, the positive electrode current collector may be used in various forms such as a film, a sheet, a foil, a net, a porous body, a foamed body, a non-woven fabric, and the like.

The positive electrode active material layer may comprise a positive electrode active material.

The positive electrode active material may comprise a compound that enables the reversible intercalation and deintercalation of lithium, specifically, a lithium-transition metal composite oxide comprising lithium and at least one transition metal selected from the group consisting of nickel, cobalt, manganese, and aluminum, and preferably, a lithium-transition metal composite oxide comprising lithium and transition metals comprising nickel, cobalt, and manganese.

More specifically, the lithium-transition metal composite oxide may be a lithium-manganese-based oxide (e.g., $LiMnO_2$, $LiMn_2O_4$, and the like), a lithium-cobalt-based oxide (e.g., $LiCoO_2$ and the like), a lithium-nickel-based oxide (e.g., $LiNiO_2$ and the like), a lithium-nickel-manganese-based oxide (e.g., $LiNi_{1-Y}Mn_YO_2$ (where $0<Y<1$), $LiMn_{2-z}Ni_zO_4$ (where $0<z<2$), and the like), a lithium-nickel-cobalt-based oxide (e.g., $LiNi_{1-y1}CO_{Y1}O_2$ (where $0<Y1<1$) and the like), a lithium-manganese-cobalt-based oxide (e.g., $LiCo_{1-y2}Mn_{Y2}O_2$ (where $0<Y2<1$), $LiMn_{2-z1}Co_{z1}O_4$ (where $0<z1<2$), and the like), a lithium-nickel-manganese-cobalt-based oxide (e.g., $Li(Ni_{p-}$ $Co_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$) and the like), or a lithium-nickel-cobalt-manganese-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, each of p2, q2, r3 and s2 is the atomic fraction of elements which are independent of one another, and $0<p2<1$, $0<q2<1$, $0<r3<1$, $0<s2<1$, $p2+q2+r3+s2=1$) and the like), which may be used alone or in a mixture of two or more thereof. Among these, in view of improving the capacity characteristics and stability of a battery, the lithium-transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, and the like), or a lithium nickel-cobalt-aluminum oxide (e.g., $Li(Ni_{0.8}Co_{0.15}Al_{0.05})O_2$ and the like), and in consideration of significant improvement caused by control of the type and content ratio of constituent elements for forming a lithium-transition metal composite oxide, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.01})O_2$, which may be used alone or in a mixture of two or more thereof.

The positive electrode active material may be comprised in an amount of 80 wt % to 99 wt %, and preferably, 92 wt % to 98.5 wt % in the positive electrode active material layer in consideration of sufficiently exhibiting the capacity of the positive electrode active material.

The positive electrode active material layer may further comprise a binder and/or a conductive material in addition to the above-described positive electrode active material.

The binder is a component for assisting the bonding between the active material and the conductive material and the bonding to the current collector. Specifically, the binder may comprise at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, styrene butadiene rubber, and fluorine rubber and preferably comprises polyvinylidene fluoride.

The binder may be comprised in an amount of 1 wt % to 20 wt %, and preferably, 1.2 wt % to 10 wt % in the positive electrode active material layer in view of sufficiently ensuring the bonding between components such as the positive electrode active material.

The conductive material may be used to assist and improve the conductivity of a secondary battery and is not particularly limited as long as it does not cause a chemical change and has conductivity. Specifically, the conductive material may comprise at least one selected from the group consisting of graphite such as natural graphite, artificial graphite, or the like; a carbon black-based material such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker consisting of zinc oxide, potassium titanate, or the like; a conductive metal oxide such as titanium oxide or the like; and a polyphenylene derivative and preferably comprises carbon black in view of improving conductivity.

The conductive material may be comprised in an amount of 1 wt % to 20 wt %, and preferably, 1.2 wt % to 10 wt % in the positive electrode active material layer in view of sufficiently ensuring electrical conductivity.

The positive electrode active material layer may have a thickness of 30 μm to 400 μm, and preferably, 50 μm to 150 μm.

The positive electrode may be manufactured by applying a positive electrode slurry comprising a positive electrode active material, and optionally, a binder, a conductive material, and a solvent for forming a positive electrode slurry onto the positive electrode current collector, followed by drying and rolling.

The solvent for forming a positive electrode slurry may comprise an organic solvent such as N-methyl-2-pyrrolidone (NMP) or the like and may be used in an amount suitable for achieving preferable viscosity when the positive electrode active material, and optionally, a binder, a conductive material, and the like are comprised. For example, the solvent for forming a positive electrode slurry may be comprised in the positive electrode slurry such that the concentration of a solid content comprising the positive electrode active material, and optionally, the binder and the conductive material is in a range of 50 wt % to 95 wt %, and preferably, 70 wt % to 90 wt %.

The separator may be interposed between the negative electrode and the positive electrode.

The separator is not particularly limited as long as it is generally used in a lithium secondary battery to separate a negative electrode from a positive electrode and provide a moving path for lithium ions, and particularly, it is preferable that the separator has low resistance to ion movement of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof, may be used. An example of the stacked structure having two or more layers may comprise a three-layer stacked structure of an ethylene polymer/propylene polymer/ethylene polymer. In addition, a conventional porous non-woven fabric, for example, a non-woven fabric formed of a high melting point glass fiber or a polyethylene terephthalate fiber may be used. In addition, a coated separator comprising a ceramic component or a polymer material may be used to ensure thermal resistance or mechanical strength and may be selectively used in a single- or multi-layered structure.

The electrolyte solution may comprise an organic solvent and a lithium salt.

The organic solvent is not specifically limited so long as it functions as a medium through which ions involved in an electrochemical reaction of a battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or fluoroethylene carbonate (FEC); an alcohol-based solvent such as ethyl alcohol or isopropyl alcohol; a nitrile-based solvent such as R—CN (R is a linear, branched or cyclic C2 to C20 hydrocarbon group, and may comprise a double-bond, an aromatic ring or an ether bond); an amide-based solvent such as dimethylformamide; a dioxolane-based solvent such as 1,3-dioxolane; or a sulfolane-based solvent may be used. Among these, a carbonate-based solvent is preferably used, and a mixture of a cyclic carbonate having high ionic conductivity and a high dielectric constant, such as ethylene carbonate, propylene carbonate, fluoroethylene carbonate, or the like, which can increase the charge and discharge performance of the battery, and a linear carbonate-based compound with low viscosity (for example, ethyl methyl carbonate, dimethyl carbonate, diethyl carbonate, etc.) is more preferably used. In this case, when a cyclic carbonate and a chain-type carbonate are mixed in a volume ratio of about 1:9 to about 5:5, the electrolyte solution may exhibit excellent performance. More preferably, when fluoroethylene carbonate as a cyclic carbonate and diethyl carbonate as a linear carbonate are mixed, it is preferable in view of improving the performance of the electrolyte solution.

The lithium salt is not particularly limited as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in a range of 0.1 to 2.0 M. When a concentration of lithium salt is in the above-described range, the electrolyte has suitable conductivity and viscosity and thus may exhibit excellent electrolyte performance, and the lithium ions may effectively move.

The electrolyte solution may further comprise an additive so that an SEI layer is stably and flexibly formed on the negative electrode that uses silicon-based active materials. Specifically, the additive may comprise at least one selected from the group consisting of vinylene carbonate (VC), polystyrene (PS), succinonitrile, ethylene glycol bis (propionitrile) ether, and lithium bis(fluorosulfonyl)imide and preferably may further comprise an additive comprising vinylene carbonate in view of the easy and stable formation of the SEI layer through ring-opening polymerization.

The additive may be comprised in an amount of 0.1 wt % to 15 wt %, and preferably, 0.5 wt % to 5 wt % in the electrolyte solution.

The secondary battery structure may be formed by a method comprising the steps of preparing an electrode assembly comprising a negative electrode, a positive electrode, and a separator and impregnating the electrode assembly with an electrolyte solution by injecting the electrolyte solution into the electrode assembly. Since the electrode assembly is impregnated with the electrolyte solution, the secondary battery structure may be activated through a charging and discharging process to be described below.

The impregnating of the electrode assembly may be performed for 12 to 48 hours, and preferably, 18 hours to 30 hours in view of allowing the electrode assembly to be sufficiently wetted with the electrolyte solution and the activation according to the charging and discharging of the secondary battery structure to be more smoothly performed.

The impregnating of the electrode assembly may be performed at room temperature, and specifically, at 23° C. to 27° C.

The secondary battery structure may further comprise a pouch configured to accommodate the electrode assembly and the electrolyte solution. Specifically, the secondary battery structure may be manufactured by a method comprising the steps of accommodating the electrode assembly comprising a negative electrode, a positive electrode, and a separator in the pouch and impregnating the electrode assembly with an electrolyte solution by injecting the electrolyte solution into the pouch.

The description of the impregnating of the electrode assembly is given above.

The secondary battery structure may have an N/P ratio, which is calculated by Equation 1 below, of 1.5 to 4, and preferably, 1.8 to 2.5, $$N/P \text{ ratio} = \text{discharge capacity per unit area of negative electrode/discharge capacity per unit area of positive electrode} \qquad \text{[Equation 1]}$$

When the N/P ratio is adjusted to the above-described range, the discharge capacity of the negative electrode is designed to be greater than the discharge capacity of the positive electrode by a certain level, and thus, when lithium is injected into the negative electrode from the positive electrode, the ratio of lithium to the entire silicon-based active material in the negative electrode may be reduced. Accordingly, the deterioration of lifespan characteristics at the entire battery level caused by the volume expansion of the negative electrode may be minimized. In addition, when the N/P ratio is adjusted to the above-described range, phenomena that occur as the thickness of the negative electrode becomes excessively greater than that of the positive electrode, that is, a decrease in electrical conductivity, deterioration of lifespan characteristics, and a decrease in energy density, may be prevented.

The "discharge capacity per unit area of the negative electrode" may be obtained by the following method. Specifically, a half-cell is manufactured with a negative electrode sample comprising a negative electrode active material and a counter electrode (e.g., a lithium metal electrode) facing the negative electrode sample. A discharge capacity measured by charging and discharging the half-cell is divided by the weight of the negative electrode active material to obtain a "discharge capacity of the negative electrode sample per unit weight of the negative electrode active material." A secondary battery is manufactured with a negative electrode comprising a negative electrode active material identical to the negative electrode active material used in the half-cell and a positive electrode comprising a positive electrode active material. A value obtained by multiplying the "discharge capacity of the negative electrode sample per unit weight of the negative electrode active material" by the weight of the negative electrode active material comprised in the secondary battery is divided by the area of the negative electrode comprised in the secondary battery to obtain the "discharge capacity per unit area of the negative electrode."

The "discharge capacity per unit area of the positive electrode" may be obtained by the following method. Specifically, a half-cell is manufactured with a positive electrode sample comprising a positive electrode active material and a counter electrode (e.g., a lithium metal electrode) facing the positive electrode sample. A discharge capacity measured by charging and discharging the half-cell is divided by the weight of the positive electrode active material to obtain a "discharge capacity of the positive electrode sample per unit weight of the positive electrode active material." A secondary battery is manufactured with a positive electrode comprising a positive electrode active material identical to the positive electrode active material used in the half-cell and a negative electrode comprising a negative electrode active material. A value obtained by multiplying the "discharge capacity of the positive electrode sample per unit weight of the positive electrode active material" by the weight of the positive electrode active material comprised in the secondary battery is divided by the area of the positive electrode comprised in the secondary battery to obtain the "discharge capacity per unit area of the positive electrode."

<Activation of Secondary Battery Structure>

The method of manufacturing a secondary battery of the present invention comprises activating a secondary battery structure by charging and discharging for at least one cycle while pressing the secondary battery structure at 1.5 MPa to 3.5 MPa.

In the method of manufacturing a secondary battery of the present invention, when the secondary battery structure is charged and discharged for the activation, a pressing process is performed simultaneously. According to the present invention, the volume of the negative electrode active material is expanded/contracted while lithium is intercalated/deintercalated into/from the negative electrode active material due to the charging and discharging process, and here, the volume expansion of the negative electrode active material may be controlled by performing the pressing process together with the charging and discharging process.

In addition, in the method of manufacturing a secondary battery of the present invention, when the secondary battery structure is charged and discharged for the activation, the secondary battery structure is pressed at 1.5 MPa to 3.5 MPa. When the charging and discharging process is performed while pressing the secondary battery structure within the pressure range, the volume expansion of the silicon-based active material may be sufficiently controlled, so that the silicon-based active material may be prevented from cracking due to the volume expansion/contraction thereof and an increase in the distance between active materials may be prevented. In addition, generally, when the silicon-based active material is activated, due to the cracking of the silicon-based active material caused by the volume expansion/contraction and an increase in distance between active materials, an SEI layer formation reaction may continuously occur, and accordingly, gas may be excessively produced, resistance may be increased, and lifespan may be deteriorated. However, according to the present invention, since the charging and discharging process is performed while performing a pressing process within the above pressure range, the active materials may be prevented from cracking and the distance between the active materials may be maintained, thereby forming a proper level of SEI layer and minimizing gas production. In addition, when the charging and discharging process is performed while pressing the secondary battery structure within the above pressure range, pores of the negative electrode or the negative electrode active material layer may be realized at an appropriate level, so that pores are prevented from being reduced due to the excessive pressure and the problem of the depletion of the electrolyte solution due to the reduction of the pores may be solved, thereby improving lifespan characteristics.

When the secondary battery structure is pressed at 1.5 MPa or less while the secondary battery structure is activated, the volume expansion of the silicon-based active material may not be sufficiently prevented, so that damage to the active material and an increase in the distance between the active materials may occur, and lifespan characteristics may be deteriorated due to the excessive increase of the SEI layer. When the secondary battery structure is pressed at 3.5 MPa or more while the secondary battery structure is activated, the silicon-based active material whose volume is expanded during charging and discharging may fill the pores of the negative electrode, so that the pores of the negative electrode may be reduced more than necessary, the electrolyte solution may be depleted according to the decrease in pores, and the silicon-based active material may be damaged due to the excessive pressure, resulting in the deterioration of battery lifespan.

Preferably, the pressing process may be performed at 2 MPa to 3 MPa, and when the silicon-based active material is pressed within the pressure range, the volume expansion of the silicon-based active material may be sufficiently controlled while maintaining the pores of the negative electrode at an appropriate level, thereby further improving the lifespan characteristics of the battery.

The activation process may be performed, for example, by disposing the secondary battery structure between a pair of pressing plates and then pressing the secondary battery structure at 25 kgf·cm to 55 kgf·cm, and preferably, 35 kgf·cm to 45 kgf·cm, and thus, the above-described pressing pressure range of 1.5 MPa to 3.5 MPa, and preferably, 2 MPa to 3 MPa may be realized. The pressing pressure by the pressing plate may be adjusted using a torque wrench.

The activation process is performed by performing charging and discharging for at least one cycle while performing the pressing process within the above-described pressure range.

The charging and discharging may be performed using an electrochemical charging and discharging device.

The charging and discharging for the activation of the secondary battery structure may preferably be performed for at least two cycles, more preferably, 2 to 8 cycles, and even more preferably, 3 to 6 cycles. In general, in the case of the silicon-based active material, the degree of the volume expansion/contraction due to charging and discharging is greater than that of the carbon-based active material, and thus, a new surface may be generated at a negative electrode due to a change in the structure of the silicon-based active material. Accordingly, charging and discharging of the secondary battery structure are preferably performed for the above-described cycles so that the SEI layer generated during activation may also be sufficiently formed on the newly formed surface of the negative electrode.

A voltage range in which the charging and discharging are performed may be appropriately set in consideration of the type of a positive electrode used to face the negative electrode, or a positive electrode active material. Specifically, in the activation process, the charging and discharging may be performed in a voltage range of 2.5 V to 4.35 V. More specifically, the positive electrode comprises a positive electrode current collector and a positive electrode active material layer formed on the positive electrode current collector, wherein the positive electrode active material layer may comprise a positive electrode active material comprising a lithium-nickel-cobalt-manganese-based composite oxide, and in the activation process, the charging and discharging may be performed in a voltage range of 2.5 V to 4.2 V, and preferably, 3 V to 4.2 V. In addition, the positive electrode active material layer may comprise a positive electrode active material comprising a lithium-cobalt-based oxide, and in the activation process, the charging and discharging may be performed in a voltage range of 3 V to 4.35 V.

The activation process may be performed at room temperature, and specifically, at 23° C. to 27° C.

According to the present invention, the negative electrode may comprise a negative electrode current collector and a negative electrode active material layer formed on the negative electrode current collector, wherein the negative electrode active material layer may comprise the silicon-based active material, and a porosity of the negative electrode after the activation may be in a range of 55 to 70%, and preferably, 56 to 62%. When the negative electrode after the activation has a porosity within the above-described range, an electrolyte solution may be sufficiently present in the negative electrode so that lithium intercalation/deintercalation and electrical conductivity may be realized at an excellent level, and the excessive reduction of pores due to volume expansion of the silicon-based active material may be prevented.

Herein, the porosity of the negative electrode after activation is defined as a value calculated by Equation 3 below, $$\text{porosity of negative electrode after activation (\%)}= [1-\{(\text{electrode density of negative electrode active material layer before activation} \times d_1/d_2)/(\text{true density of negative electrode active material layer before activation})\}] \times 100 \quad \text{[Equation 3]}$$

where, $d_1$ is a thickness of the negative electrode active material layer before activation, $d_2$ is a thickness of the negative electrode active material layer after activation, an electrode density of the negative electrode active material layer before activation is the density of the negative electrode active material layer measured with the negative electrode before activation, and a true density of the negative electrode active material layer before activation is the density of the negative electrode active material layer measured when the negative electrode before activation is pressed with pressing equipment until the thickness of the negative electrode does not change.

According to Equation 3, it may be difficult to directly measure the porosity of the negative electrode after activation, and thus, the porosity of the negative electrode after activation may be calculated hypothetically by using the true density and the electrode density of the negative electrode active material layer before activation and a thickness ratio $d_1/d_2$ of the negative electrode active material layer before/after activation. Specifically, according to Equation 3, the true density of the negative electrode active material layer before activation is assumed to be same as the true density of the negative electrode active material layer after activation, and the electrode density of the negative electrode active material layer after activation is assumed to be a value obtained by multiplying the electrode density of the negative electrode active material layer before activation by the ratio $d_1/d_2$ of a thickness $d_1$ of the negative electrode active material layer before activation to a thickness $d_2$ of the negative electrode active material layer after activation.

In the secondary battery structure of the present invention, since the negative electrode comprises a silicon-based active material, the thickness of the negative electrode active material layer may be increased due to the volume expansion of the silicon-based active material when the secondary battery structure is charged and discharged for the activation. In this regard, the porosity of the negative electrode after activation may be greater than the porosity of the negative electrode before activation.

The method of manufacturing a secondary battery of the present invention may further comprise removing gas produced in the activation process.

After the secondary battery structure is activated, gas may be produced as a by-product resulting from the generation of an SEI layer, the generation of irreversible capacity, and the like. Accordingly, in order to use the activated secondary battery, a process of removing by-products may be performed, and through the gas removal process, the secondary battery may be manufactured in a usable form.

The removing of the gas may be performed without limitation by a method commonly used in the field of a secondary battery. For example, the removing of the gas may be performed by partially opening the secondary battery structure to remove the gas and sealing the secondary battery structure in a vacuum state.

The secondary battery manufactured by the method of manufacturing a secondary battery of the present invention is useful in the field of portable devices such as mobile phones, notebook computers, digital cameras, and the like and electric vehicles such as hybrid electric vehicles (HEVs) and the like and is preferably used, particularly, as a battery constituting a medium-to-large-sized battery module. Accordingly, the present invention also provides a medium-to-large battery module comprising the above-described secondary battery as a unit battery.

Such a medium-to-large battery module is preferably applied to a power source for a device requiring a high output and a large capacity, for example, an electric vehicle, an HEV, or a power storage device.

Hereinafter, examples of the present invention will be described in detail so that those of ordinary skill in the art can easily carry out the present invention. However, the present invention may be embodied in various different forms and is not limited to the examples described below.

EXAMPLES

Example 1: Manufacture of Secondary Battery

<Formation of Secondary Battery Structure>
1. Manufacture of Negative Electrode Si (average particle diameter ($D_{50}$): 2.5 μm) as a silicon-based active material, carbon black (product name: Super C65, manufacturer: TIMCAL), as a negative electrode conductive material, and a mixture (weight average molecular weight: about 360,000 g/mol) obtained by mixing polyvinyl alcohol and polyacrylic acid in a weight ratio of 66:34 as a negative electrode binder were added to a solvent for forming a negative electrode slurry (distilled water) and mixed to prepare a negative electrode slurry (a solid content was 25 wt % with respect to the total weight of the negative electrode slurry). The silicon-based active material, the negative electrode conductive material, and the negative electrode binder were mixed at a weight ratio of 75:10:15.

The negative electrode slurry was applied in a loading amount of 68.4 mg/25 cm² onto one surface of a copper current collector (thickness: 8 μm) as a negative electrode current collector, roll-pressed, and dried in a 130° C. vacuum oven for 10 hours to form a negative electrode active material layer (thickness: 44 μm), and the resultant was used as a negative electrode (the negative electrode had a thickness of 52 μm and a porosity of 39.8%).

The porosity of the negative electrode (the porosity of the negative electrode before activation) was determined by Equation 2 below, $$\text{porosity of negative electrode (\%)} = \{1 - \text{electrode density of negative electrode active material layer/true density of negative electrode active material layer}\} \times 100 \quad \text{[Equation 2]}$$

In Equation 2, the electrode density of the negative electrode active material layer is the density of the negative electrode active material layer measured with a negative electrode (a negative electrode before activation), and the true density of the negative electrode active material layer is the density of the negative electrode active material layer measured when the negative electrode (the negative electrode before activation) is pressed using pressing equipment until the thickness of the negative electrode is not changed.

2. Manufacture of Positive Electrode

A mixture obtained by mixing $LiNi_{0.6}Co_{0.2}Mn_{0.2}O_2$ (average particle diameter ($D_{50}$): 11 μm) as a positive electrode active material, carbon black (product name: Super C65, manufacturer: TIMCAL) as a positive electrode conductive material, and polyvinylidene fluoride (PVDF) as a positive electrode binder in a weight ratio of 97:1.5:1.5 was added to a N-methylpyrrolidone (NMP) solvent and mixed to prepare a positive electrode slurry. The positive electrode slurry was applied in a loading amount of 458 mg/25 cm² onto one surface of an aluminum current collector (thickness: 12 μm) as a positive electrode current collector, roll pressed, and dried in a 130° C. vacuum oven for 10 hours to form a positive electrode active material layer (thickness: 110 μm), and the resultant was used as a positive electrode (a thickness of the positive electrode: 122 μm).

3. Formation of Secondary Battery Structure

The negative electrode and the positive electrode prepared above were disposed to face each other, and a separator (thickness: 17.5 μm) having a stacked structure of ethylene polymer (PE)/propylene polymer (PP)/PE was interposed between the negative electrode and the positive electrode to prepare an electrode assembly.

The electrode assembly was accommodated in a pouch, an electrolyte solution was injected into the pouch, and the electrode assembly was impregnated with the electrolyte solution to form a secondary battery structure.

The electrolyte solution was prepared by adding VC as an additive at 3 wt % with respect to the total weight of the electrolyte solution to an organic solvent in which FEC and DMC were mixed in a volume ratio of 30:70 and adding $LiPF_6$ as a lithium salt at a concentration of 1 M.

The temperature when the electrode assembly was impregnated was 25° C., and the impregnation was performed for 24 hours.

4. N/P Ratio

The negative electrode prepared above was cut into a predetermined size to prepare a negative electrode sample. A lithium metal electrode of the same size as the negative electrode sample was prepared and was disposed to face the negative electrode sample. A polyethylene separator was interposed between the negative electrode sample and the lithium metal electrode, and then an electrolyte solution was injected to prepare a coin-type half-cell. The electrolyte solution was prepared by adding $LiPF_6$ as a lithium salt at a concentration of 1 M to an organic solvent in which ethylene carbonate and ethylmethyl carbonate were mixed in a volume ratio of 50:50. A discharge capacity obtained by charging/discharging the coin-type half-cell at 0.1 C was divided by the weight of the silicon-based active material comprised in the negative electrode sample, thereby obtaining a discharge capacity of the negative electrode sample per unit weight of the silicon-based active material.

Further, the positive electrode prepared above was cut into a predetermined size to prepare a positive electrode sample. A lithium metal electrode of the same size as the positive electrode sample was prepared and was disposed to face the positive electrode sample. A polyethylene separator was interposed between the positive electrode sample and the lithium metal electrode, and then an electrolyte solution was injected to prepare a coin-type half-cell. The electrolyte solution was prepared by adding $LiPF_6$ as a lithium salt at a concentration of 1 M to an organic solvent in which ethylene carbonate and ethylmethyl carbonate were mixed in a volume ratio of 50:50. A discharge capacity obtained by charging/discharging the coin-type half-cell at 0.1 C was divided by the weight of the positive electrode active material comprised in the positive electrode sample, thereby obtaining a discharge capacity of the positive electrode sample per unit weight of the positive electrode active material.

A value obtained by multiplying the discharge capacity of the negative electrode sample per unit weight of the negative electrode active material, which was measured above, by the weight of the silicon-based active material was divided by the area of the negative electrode to obtain the discharge capacity per unit area of the negative electrode. In addition, a value obtained by multiplying the discharge capacity of the positive electrode sample per unit weight of the positive electrode active material by the weight of the positive electrode active material was divided by the area of the positive electrode to obtain the discharge capacity per unit area of the positive electrode.

The discharge capacity per unit area of the negative electrode was divided by the discharge capacity per unit area of the positive electrode to obtain an N/P ratio (=2).

<Activation of Secondary Battery Structure>

The secondary battery structure prepared above was disposed between a pair of pressing plates and was activated by charging and discharging at 25° C. for 5 cycles with an electrochemical charging and discharging device (manufacturer: PNE SOLUTION) while being pressed with torque of 30 kgf·cm (pressure: 1.87 MPa) using a torque wrench.

The charging and discharging were performed with the following conditions, charging conditions: 0.2 C, constant current (CC)/constant voltage (CV) (4.2 V, 0.05 C cut-off)

discharging conditions: 0.2 C, CC (3.0 V cut-off).

A gas removal process was performed on the secondary battery structure whose activation was completed, and used as a secondary battery of Example 1.

Example 2: Manufacture of Secondary Battery

A secondary battery of Example 2 was manufactured in the same manner as in Example 1, except that the torque of the torque wrench was 40 kgf·cm and the pressure at the time of pressing was 2.49 MPa.

Example 3: Manufacture of Secondary Battery

A secondary battery of Example 3 was manufactured in the same manner as in Example 1, except that the torque of the torque wrench was 50 kgf·cm and the pressure at the time of pressing was 3.12 MPa.

Example 4: Manufacture of Secondary Battery

A secondary battery of Example 4 was manufactured in the same manner as in Example 2, except that the charging and discharging was performed for only one cycle in the activation of a secondary battery structure.

Comparative Example 1: Manufacture of Secondary Battery

A secondary battery of Comparative Example 1 was manufactured in the same manner as in Example 1, except that the pressing process was not performed in the activation of a secondary battery structure.

Comparative Example 2: Manufacture of Secondary Battery

A secondary battery of Comparative Example 2 was manufactured in the same manner as in Example 1, except that the torque of the torque wrench was 5 kgf·cm and the pressure at the time of pressing was 0.31 MPa.

Comparative Example 3: Manufacture of Secondary Battery

A secondary battery of Comparative Example 3 was manufactured in the same manner as in Example 1, except that the torque of the torque wrench was 10 kgf·cm and the pressure at the time of pressing was 0.62 MPa.

Comparative Example 4: Manufacture of Secondary Battery

A secondary battery of Comparative Example 4 was manufactured in the same manner as in Example 1, except that the torque of the torque wrench was 20 kgf·cm and the pressure at the time of pressing was 1.25 MPa.

Comparative Example 5: Manufacture of Secondary Battery

A secondary battery of Comparative Example 5 was manufactured in the same manner as in Example 1, except that the torque of the torque wrench was 60 kgf·cm and the pressure at the time of pressing was 3.74 MPa.

Comparative Example 6: Manufacture of Secondary Battery

The secondary battery structure manufactured in Example 1 was disposed between a pair of pressing plates before an activation process, and pressed at 40 kgf·cm (pressure: 2.94 MPa) for 24 hours using the torque wrench.

After the pressing process, the pressing plates were removed from the secondary battery structure, and the secondary battery structure was charged and discharged at 25° C. for 5 cycles using an electrochemical charging and discharging device (a product of PNE SOLUTION). The charging and discharging conditions were as follows, charging conditions: 0.2 C, CC/CV (4.2 V, 0.05 C cut-off)

discharging conditions: 0.2 C, CC (3.0 V cut-off).

A gas removal process was performed on the secondary battery structure whose activation was completed, and used as a secondary battery of Comparative Example 6.

Comparative Example 7: Manufacture of Secondary Battery

The secondary battery manufactured in Comparative Example 1 was disposed between a pair of pressing plates, and pressed at 40 kgf·cm (pressure: 2.49 MPa) using a torque wrench.

The secondary battery after the pressing process was used as a secondary battery of Comparative Example 7.

Experimental Example 1: Evaluation of Porosity of Negative Electrode after Activation The porosity of the negative electrode after activation was evaluated for the secondary batteries manufactured in Examples 1 to 4 and Comparative Examples 1 to 7.

The porosity of the negative electrode after activation was determined by Equation 3 below, porosity of negative electrode after activation (%)=
[1−{(electrode density of negative electrode
active material layer before activation×$d_1/d_2$)/
(true density of negative electrode active mate-
rial layer before activation)}]×100          [Equation 3]

where, $d_1$ is a thickness of the negative electrode active material layer before activation, $d_2$ is a thickness of the negative electrode active material layer after activation, an electrode density of the negative electrode active material layer before activation is the density of the negative electrode active material layer measured with the negative electrode before activation, and a true density of the negative electrode active material layer before activation is the density of the negative electrode active material layer measured when the negative electrode before activation is pressed with pressing equipment until the thickness of the negative electrode does not change.

TABLE 1

|  | Porosity of negative electrode before activation (%) | Porosity of negative electrode after activation (%) |
| --- | --- | --- |
| Example 1 | 39.8 | 68.7 |
| Example 2 | 39.8 | 57.1 |
| Example 3 | 39.8 | 55.8 |
| Example 4 | 39.8 | 64.1 |
| Comparative Example 1 | 39.8 | 84.7 |
| Comparative Example 2 | 39.8 | 81.3 |
| Comparative Example 3 | 39.8 | 79.7 |
| Comparative Example 4 | 39.8 | 75.4 |
| Comparative Example 5 | 39.8 | 54.5 |
| Comparative Example 6 | 39.8 | 82.5 |
| Comparative Example 7 | 39.8 | 84.1 |

Referring to Table 1, in the secondary batteries of Examples 1 to 4, which were activated by charging and discharging the secondary battery structure while pressing with a pressure range according to the present invention, it was evaluated that the negative electrode secured an appropriate level of pores, but the secondary batteries of Comparative Examples did not.

Experimental Example 2: Evaluation of Lifespan Characteristics

The capacity retention rate of each of the secondary batteries manufactured in Examples 1 to 4 and Comparative Examples 1 to 7 was evaluated using an electrochemical charging and discharging device.

The secondary battery was charged and discharged up to the 100th cycle under the condition of charging (0.5 C CC/CV charging 4.2 V 0.05 C cut) and discharging (0.5 C CC discharging 3.0 V cut).

The capacity retention rate was evaluated using Equation 4 below. FIG. 1 is a graph illustrating the capacity retention rates according to cycles for Examples 1 to 4 and Comparative Examples 1 to 7.

In addition, the capacity retention rates after 100 cycles of Examples and Comparative Examples are listed in Table 2 below.

capacity retention rate (%)=(discharge capacity at
Nth cycle/discharge capacity at first cycle)×100          [Equation 4]

where N is an integer from 1 to 100.

TABLE 2

|  | Capacity retention rate after 100 cycles (%) |
| --- | --- |
| Example 1 | 61.8 |
| Example 2 | 73.1 |
| Example 3 | 70.4 |
| Example 4 | 60.5 |
| Comparative Example 1 | 10.8 |
| Comparative Example 2 | 10.5 |
| Comparative Example 3 | 12.4 |
| Comparative Example 4 | 10.7 |
| Comparative Example 5 | 21.5 |
| Comparative Example 6 | 17.8 |
| Comparative Example 7 | 7.7 |

Referring to FIG. 1 and Table 2, it can be seen that the secondary batteries of Examples 1 to 4, which were activated by charging and discharging the secondary battery structure while pressing with a pressure range according to the present invention, have an improved level of lifespan characteristics compared to those of the Comparative Examples, by properly controlling the increase in thickness due to the initial volume expansion during activation, allowing an SEI layer to be stably formed, and securing an appropriate level of pores in the negative electrode. However, in the case of the secondary batteries of Comparative Examples 1 to 4 that were not pressed in the activation process or pressed at a low pressure, it can be seen that the volume expansion of the active material cannot be controlled, and accordingly, it is difficult to form a stable SEI layer, and gas is excessively produced due to side reactions, resulting in a rapid decrease in lifespan characteristics from the beginning of the cycle.

Further, it can be seen that lifespan characteristics are remarkably deteriorated even in the case of the secondary battery of Comparative Example 5 that was pressed with an excessively high pressure during activation. It is considered that the deterioration of the lifespan characteristics is caused by the damage to the active material due to the high pressing pressure. In addition, it is considered that the deterioration of the lifespan characteristics is caused by the phenomenon in which the active material whose volume is expanded due to the high pressing pressure closes the pores of the negative electrode, and the electrolyte solution inside the negative electrode is reduced or depleted due to the decrease in pores in the negative electrode so that the lifespan characteristics of the battery is deteriorated.

In addition, in the case of the secondary batteries of Comparative Examples 6 and 7, in which a pressing process and an activation process are not performed simultaneously on the secondary battery structure, the volume expansion of the active material during activation cannot be controlled to an appropriate level, thereby exhibiting a rapid deterioration in lifespan characteristics.

What is claimed is:

1. A method of manufacturing a secondary battery, comprising:
  forming a secondary battery structure comprising an electrode assembly comprising a negative electrode, a positive electrode, and a separator, and an electrolyte solution; and
  activating the secondary battery structure by charging and discharging for at least one cycle while pressing the secondary battery structure at 1.5 MPa to 3.5 MPa,
  wherein the negative electrode comprises a silicon-based active material, wherein the secondary battery structure has an N/P ratio of 1.5 to 4, wherein the N/P ratio is calculated by Equation 1 below, $$N/P \text{ ratio}=\text{discharge capacity per unit area of nega-tive electrode/discharge capacity per unit area of positive electrode,} \qquad \text{[Equation 1]}$$

wherein a porosity of the negative electrode before activation is in a range of 37% to 45%, wherein the negative electrode comprises a negative electrode current collector and a negative electrode active material layer formed on the negative electrode current collector, the negative electrode active material layer comprises the silicon-based active material, and a porosity of the negative electrode after activation calculated by Equation 3 below is in a range of 55% to 70%, $$\text{porosity of negative electrode after activation (\%)}= [1-\{(\text{electrode density of negative electrode active material layer before activation} \times d_1/d_2)/ (\text{true density of negative electrode active material layer before activation})\}] \times 100 \qquad \text{[Equation 3]}$$

where, $d_1$ is a thickness of a negative electrode active material layer before activation, $d_2$ is a thickness of a negative electrode active material layer after activation, an electrode density of the negative electrode active material layer before activation is the density of a negative electrode active material layer measured with the negative electrode before activation, and a true density of the negative electrode active material layer before activation is the density of the negative electrode active material layer measured when the negative electrode before activation is pressed with pressing equipment until a thickness of the negative electrode does not change.

2. The method of claim 1, wherein in the activating the secondary battery structure, the pressing is performed at 2 MPa to 3 MPa.

3. The method of claim 1, wherein the silicon-based active material comprises a compound represented by Formula 1 below, $$SiO_x(0 \le x < 2). \qquad \text{[Formula 1]}$$

4. The method of claim 1, wherein the silicon-based active material is Si.

5. The method of claim 1, wherein an average particle diameter ($D_{50}$) of the silicon-based active material is in a range of 1 μm to 10 μm.

6. The method of claim 1, wherein the activating the secondary battery structure is performed by disposing the secondary battery structure between a pair of pressing plates and then pressing the secondary battery structure at 25 kgf·cm to 55 kgf·cm.

7. The method of claim 1, wherein the activating the secondary battery structure is performed at 23° C. to 27° C.

8. The method of claim 1, wherein in the activating the secondary battery structure, the charging and discharging are performed for 2 cycles to 8 cycles.

9. The method of claim 1, wherein the positive electrode comprises a positive electrode current collector and a positive electrode active material containing a lithium-nickel-cobalt-manganese-based composite oxide formed on the positive electrode current collector, and in the activating the secondary battery structure, the charging and discharging are performed in a voltage range of 2.5 V to 4.2 V.

* * * * *